US006216436B1

United States Patent
Ranasinghe et al.

(10) Patent No.: US 6,216,436 B1
(45) Date of Patent: Apr. 17, 2001

(54) INTEGRATED GASIFICATION COMBINED CYCLE POWER PLANT WITH KALINA BOTTOMING CYCLE

(75) Inventors: Jatila Ranasinghe; Ashok Kumar Anand, both of Niskayuna; Raub Warfield Smith, Ballston Lake, all of NY (US)

(73) Assignee: General Electric Co., Schenectady, NY (US)

( * ) Notice: Subject to any disclaimer, the term of this patent is extended or adjusted under 35 U.S.C. 154(b) by 0 days.

(21) Appl. No.: 09/173,122

(22) Filed: Oct. 15, 1998

(51) Int. Cl.[7] .................................................. F02C 3/28
(52) U.S. Cl. ............................... 60/39.02; 60/39.12
(58) Field of Search ................................ 60/39.02, 39.04, 60/39.12, 39.17, 39.161, 39.5

(56) References Cited

U.S. PATENT DOCUMENTS

| | | | |
|---|---|---|---|
| 4,099,374 | * 7/1978 | Foster-Pegg | 60/39.12 |
| 4,238,923 | 12/1980 | Waryasz . | |
| 4,442,665 | * 4/1984 | Fick et al. | 60/39.12 |
| 4,586,340 | 5/1986 | Kalina | 60/673 |
| 4,604,867 | 8/1986 | Kalina | 60/653 |
| 4,732,005 | 3/1988 | Kalina | 60/673 |
| 5,079,909 | 1/1992 | Bruckner et al. . | |
| 5,095,708 | * 3/1992 | Kalina | 60/673 |
| 5,388,395 | * 2/1995 | Scharpf et al. | 60/39.02 |
| 5,406,786 | * 4/1995 | Scharpf et al. | 60/39.05 |
| 6,032,456 | * 3/2000 | Easom et al. | 60/39.2 |
| 6,032,467 | 3/2000 | Oshita et al. . | |

* cited by examiner

Primary Examiner—Charles G. Freay
Assistant Examiner—Robert Z. Evora
(74) Attorney, Agent, or Firm—Nixon & Vanderhye

(57) ABSTRACT

An integrated gasification combined cycle plant is combined with a Kalina bottoming cycle. High thermal energy streams 31, 69, 169 from the gasification system are provided in heat exchange relation with the two component working fluid mixture at appropriate locations along the Kalina bottoming cycle units to supplement the thermal energy from the gas turbine exhaust 28 which heats the working fluid supplied to the vapor turbines. Particularly, low temperature heat recovery fluid from the low temperature cooling section 50b of the gasification system lies in heat exchange relation 27 with the condensed working fluid from the distillation/condensation sub-system of the Kalina cycle to preheat the working fluid prior to entry into the heat recovery vapor generator 12. Heat recovery fluid from the high temperature gas cooling section 50a of the gasification system is placed in heat exchange relation 23 and 65 with the working fluid at an intermediate location along the heat recovery vapor generator 12. By supplementing the heat of the gas turbine exhaust with available heat from the gasification system, and optimal integration, increased power output and improved efficiency are obtained.

12 Claims, 1 Drawing Sheet

INTEGRATED GASIFICATION COMBINED CYCLE POWER PLANT WITH KALINA BOTTOMING CYCLE

TECHNICAL FIELD

The present invention relates to power generation plants and particularly to a method of employing a Kalina bottoming cycle in an integrated gasification combined cycle power plant.

BACKGROUND OF THE INVENTION

Integrated gasification combined cycle (IGCC) power generating plants have demonstrable lower costs, improved reliability and improved efficiencies. The IGCC process relies on two-stage combustion with clean-up between the stages. The first stage includes a gasifier for partial oxidation of fossil fuel, i.e., coal, heavy fuel oils or the like, whereas the second stage utilizes a gas turbine combustor for burning the fuel gas produced by the gasifier to complete the combustion process. For example, it has been demonstrated that inherent fuel processing losses associated with fossil fuel gasification, in conjunction with the combined cycle, can deliver superior cycle efficiency. In a simple combined cycle power generating system, there is provided a gas turbine, one or more steam turbines, one or more generators and a heat recovery steam generator. The gas turbine and steam turbine may be coupled to a single generator in a tandem arrangement or multi-shaft combined cycle systems may be provided having one or more gas turbines, generators and HRSGs for supplying steam through a common header to a separate steam turbine generator unit. In the combined cycle, heat from the gas turbine exhaust is provided in heat exchange relation with a working fluid in the heat recovery steam generator for powering the steam turbines and, hence, generating electricity or mechanical work.

In recent years, there have been substantial improvements in thermodynamic cycles employing multi-component working fluids and a combination of absorption, condensation, evaporation and recuperative heat exchange operations to reduce irreversible losses typical of conventional Rankine cycles. Generally, these improved thermodynamic cycles are known as Kalina cycles and afford demonstrable and substantial improvements in thermodynamic cycle efficiency. Kalina cycles use two interactive subsystems. The first subsystem involves a heat acquisition process for a multi-component working fluid comprising, for example, preheating, evaporating, superheating, regenerative feed heating and power generation. The second subsystem consists of a distillation/condensation subsystem (DCSS). The efficiency improvements of the Kalina cycle over the Rankine cycle are a result of the use of a multi-component working fluid, preferably an ammonia/water mixture, the components of which have different boiling points at the same pressure. The compositions of the vapor and liquid streams change at different points throughout the cycle and the sub-systems enable closer matching of the enthalpy-temperature characteristics of the working fluid and the heat source used to evaporate the working fluid and the heat sink used to condense it.

In the heat acquisition subsystem, the Kalina system closes the mismatch between the enthalpy-temperature characteristics of the heat source and working fluid as the working fluid passes through the boiler. These energy losses, typical of the Rankine cycle, are reduced by taking advantage of the changing temperature-enthalpy characteristics of the multi-component working fluid as it evaporates.

In the second subsystem, i.e., the DCSS of the Kalina cycle, the spent working fluid after expansion through the turbine, is too low in pressure and too high in ammonia concentration to be directly condensed at the temperature of available coolant. The working fluid therefore can only be partially condensed and a lean solution is mixed with a two-phase precondensed flow from a recuperative heat exchanger, thereby forming a lower concentration of ammonia/water mixture which can be fully condensed at available coolant temperature. The lean condensate is subsequently distilled recuperatively against the turbine exhaust to regenerate the working composition for the heat acquisition subsystem. The Kalina cycle has been the subject of a number of patents including U.S. Pat. Nos. 4,586,340; 4,604,867; 5,095,708 and 4,732,005, the disclosures of which are incorporated by reference. The continued quest for increased efficiencies in power generation equipment has resulting in combining the Kalina bottoming cycles in an integrated gasification combined cycle power generating system in accordance with the present invention.

BRIEF SUMMARY OF THE INVENTION

The present invention combines an integrated gasification combined cycle power system with a Kalina bottoming cycle to afford increased power output and system efficiencies. Particularly, the present system employs a gasification system including a gasifier, with gas cooling and clean-up units. The power portion of the present system includes a gas turbine, a heat recovery vapor generator with a Kalina cycle bottoming unit, vapor turbines, electric generator units and an optional air separation unit. Basically, the present invention uses thermal energy streams from the gasification system and/or the optional air separation unit to heat the working fluid in the Kalina bottoming cycle units at appropriate locations to supplement the thermal energy supplied from the gas turbine exhaust, thereby maximizing the benefit of integration of thermal streams resulting in improved net plant electrical output and thermal efficiency. In one aspect of the present invention, heat available from the high temperature cooling section of the gasification system is recovered and placed in heat exchange relation with the multi-component working fluid of the combined cycle to augment the thermal energy supplied to the working fluid by the gas turbine exhaust. A low temperature cooling section of the gasification system is also used to preheat the condensed multi-component working fluid prior to supplying the working fluid to the heat recovery vapor generator.

In a preferred embodiment according to the present invention, there is provided in an integrated gasification combined cycle power generating system having a plurality of turbines, including first and second vapor turbines and a gas turbine for driving one or more generators for generating electricity or mechanical work, and a fuel gasifier for generating fuel gas for the gas turbine, a method of operating the system comprising the steps of (a) generating fuel gas from the fuel gasifier, (b) providing a heat recovery fluid from the fuel gasifier, (c) supplying the fuel gas from the fuel gasifier to a combustor for the gas turbine to drive the gas turbine, (d) expanding a working fluid through the first vapor turbine, (e) reheating the expanded working fluid from the first vapor turbine, (f) expanding the reheated working fluid through the second vapor turbine, (g) condensing the working fluid exhausted from the second vapor turbine, (h) passing the condensed working fluid in heat exchange relation with hot exhaust gases from the gas turbine for flowing heated working fluid to the vapor turbines and (i) additionally heating the working fluid supplied the vapor turbines by passing the working fluid in heat exchange relation with the heat recovery fluid.

In a further preferred embodiment according to the present invention, there is provided in an integrated gasification combined cycle power generating system having a plurality of turbines, including first and second vapor turbines and a gas turbine for driving one or more generators for generating electricity or mechanical work, and a fuel gasifier for generating fuel gas for the gas turbine, a method of operating the system comprising the steps of (a) generating fuel gas from the fuel gasifier, (b) providing a heat recovery fluid from the fuel gasifier, (c) supplying the fuel gas from the fuel gasifier to a combustor for the gas turbine to drive the gas turbine, (d) expanding a working fluid through the first vapor turbine, (e) reheating the expanded working fluid from the first vapor turbine, (f) expanding the reheated working fluid through the second vapor turbine, (g) condensing the working fluid exhausted from the second vapor turbine, (h) passing the condensed working fluid in heat exchange relation with hot exhaust gases from the gas turbine for flowing heated working fluid to the vapor turbines and (i) heating spent working fluid exhausted from one of the first and second vapor turbines by passing the spent working fluid in heat exchange relation with the heat recovery fluid.

In a still further preferred embodiment according to the present invention, there is provided in an integrated gasification combined cycle power generating system having (i) a plurality of turbines, including a first vapor turbine and a gas turbine drivingly coupled to one or more generators for producing electricity or mechanical work, (ii) a distillation/condensation sub-system and (iii) a fuel gasifier for generating fuel gas for the gas turbine, a method of operating the system comprising the steps of (a) generating fuel gas from the fuel gasifier, (b) providing a heat recovery fluid from the fuel gasifier, (c) supplying the fuel gas from the fuel gasifier to a combustor for the gas turbine to drive the gas turbine, (d) expanding a working fluid comprised of a mixture of dissimilar components having different boiling points at the same pressure through the first vapor turbine and generating a spent stream of the mixture of dissimilar components, (e) condensing the spent stream in the sub-system. (f) supplying the condensed working fluid in heat exchange relation with hot exhaust gases from the gas turbine for flow of heated working fluid to the first vapor turbine and (g) heating the working fluid by passing the working fluid in heat exchange relation with the heat recovery fluid.

Accordingly, it is a primary object of the present invention to provide an integrated gasification combined cycle power generating system employing a Kalina bottoming cycle to increase power output and efficiency.

DETAILED DESCRIPTION OF THE INVENTION

Figure 1:
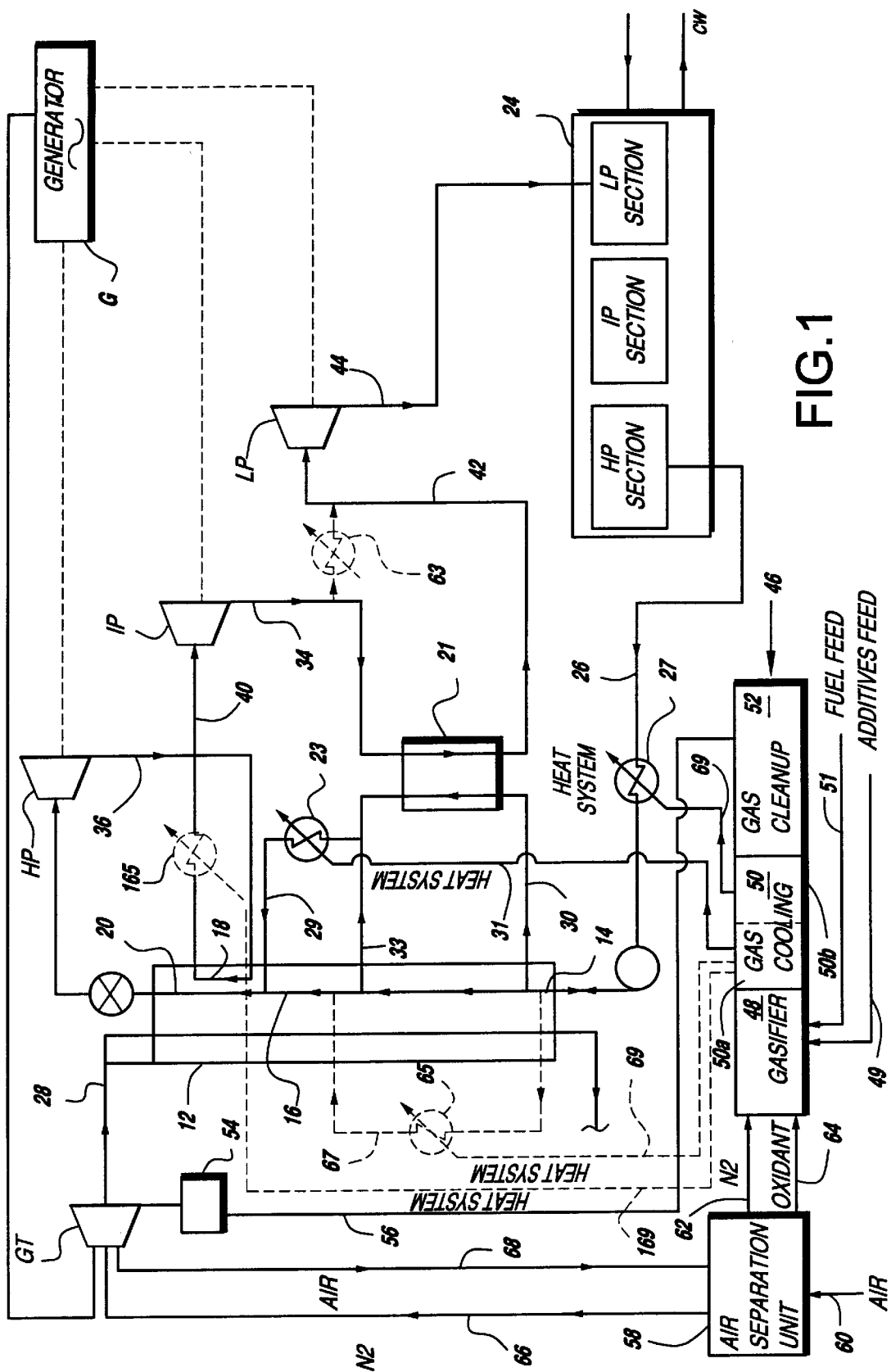
FIG. 1 is a schematic illustration of an integrated gasification combined cycle power generation system employing a Kalina-type bottoming cycle illustrating a method of utilizing thermal energy streams from the gasification system to heat the working fluid of the Kalina bottoming cycle and supplement the thermal energy provided the working fluid by the gas turbine exhaust.

Referring to FIG. 1, there is illustrated an integrated gasification combined cycle power system employing a Kalina bottoming cycle. The system includes a generator G, a gas turbine GT, and first high, second intermediate and third low pressure vapor turbines HP, IP and LP, respectively, all coupled to one or more generators G for generating electrical power or, alternatively, mechanical work. The Kalina bottoming cycle, i.e., a thermodynamic cycle, includes the HP, IP and LP turbines, a heat recovery vapor generator (HRVG), i.e., a boiler 12 including a preheater 14, an evaporator 16, a reheater 18, a superheater 20, and a distillation/condensation sub-system 24 (DCSS). A regenerative preheater 21 and/or a heat exchanger 23 using heat from the fuel gas to heat the working fluid in the HRVG as well as other ancillary components of the combined cycle described below are provided. As will be appreciated from the foregoing reference to the Kalina cycle, a multi-component working fluid mixture is used that comprises a lower boiling point fluid and a relatively higher boiling point fluid. For example, a mixture of ammonia/water may be used, although other mixtures will occur to those of skill in the art.

As illustrated, a completely condensed multi-component working fluid passes through the preheater 14 from the DCSS 24 via heat exchanger 27 in line 26. Heat is supplied to the boiler 12 from the exhaust of the gas turbine as indicated by the line 28, although it will be appreciated that such heat may be augmented as available from other systems. The preheated working fluid is divided into a first stream via a line 30 which passes through the regenerative preheater 21 for recovering heat from the exhaust of the IP pressure turbine. The working fluid combines with a second stream of the working fluid from boiler 12 via line 33 and passed in heat exchange with the further heat exchanger 23 for return to the exit of the evaporator 16. As discussed hereinafter, the stream 29 exiting the heat exchanger 23 for return to the evaporator exit is heated by heat exchange with the hot gases in the gas cooling section 50. The heat exchange could be accomplished by placing heat exchanger 23 directly in the gas cooling section 50 or indirectly through an intermediate working fluid if economic or preferred. The returning stream 29 and the stream in the HRVG 12 are recombined within the HRVG 12. The combined stream of working fluid passes through the superheater 20, where it is finally superheated by heat exchange with the high temperature gas turbine exhaust stream 28 for flow to the inlet of the high pressure vapor turbine HP, where it is expanded to convert thermal energy to mechanical energy to drive the turbine. The expanded working fluid stream from the high pressure turbine HP returns to boiler 12 via line 36 and is reheated by reheater 18 in heat exchange with the gas turbine exhaust via line 28. The reheated working fluid then flows to the inlet of the intermediate pressure turbine IP via line 40. The working fluid expanded through the intermediate pressure turbine IP passes to the regenerative preheater 21 via line 34 in heat exchange relation with the working fluid stream supplied the regenerative preheater 21 via line 30 from the preheater of the boiler 12. The working fluid vapor from the IP turbine is thus cooled, providing a portion of the heat necessary for evaporation of the working fluid in line 30. From the preheater 21, the working fluid passes via line 42 to the inlet of the low pressure turbine LP where it is expanded to a final fluid pressure level. The expanded fluid from the low pressure turbine LP passes to the DCSS 24 via line 44, where the fluid stream is condensed, pumped to a higher pressure and sent to the boiler 12 via line 26 to continue the cycle.

Still referring to FIG. 1, the gasification system, generally schematically illustrated at 46 and sometimes called a gasifier, includes a asifier section 48, a cooling section 50 having high and low temperature cooling sections 50a and 50b, respectively, and a gas clean-up section 52. The gasifier receives feed additives and fuel feed such as coal or heavy oil via lines 49 and 51, respectively. The partially oxidized fuel gas comes off the gasifier 48 at very high temperature and is cooled in section 50. After the fuel gas is cooled, it is cleaned in section 52. For example, the gas clean-up may include low temperature equipment such as a water spray scrubber or dry filtration to remove solids, followed by application of a solvent to absorb hydrogen sulfide. After the gas is cleaned up, the fuel gas is fed from the gas clean-up section 52 to the combustors 54 of the gas turbine via line 56.

An air separation unit 58 is optionally provided having an input air line 60 and lines 62 and 64 for feeding nitrogen and oxidant to the gasifier. Line 66 from air separation unit 58 supplies N2 to the gas turbine for low $NO_x$ operation, while air from the compressor discharge is supplied via line 68 to the air separation unit.

The Kalina cycle DCSS system is used to absorb, condense and regenerate the working fluid, leaving the LP vapor turbine. A DCSS system has a minimum of two pressure levels at which the working fluid mixture of two different compositions is completely condensed (e.g., the illustrated HP and IP sections. More efficient DCSS systems have three pressure levels and mixture compositions at which complete condensation occurs (e.g., HP, IP and LP sections). A DCSS mixture stream is assigned to a particular pressure section by determining the final condenser which sets the pressure of that stream (e.g., the LP condenser sets the pressure of the vapor turbine exhaust line and, hence, the turbine exhaust line is considered to be in the LP section of the DCSS). The present invention can be applied to any DCSS system with two or more pressure level condensers.

It will be appreciated from the foregoing description that thermal energy streams from the gasifier are used to heat the working fluid in the Kalina bottoming cycle at appropriate places in the fluid system to supplement the thermal energy from the gas turbine exhaust to maximize the benefit of integration of thermal streams, resulting in improved net plant electrical output and thermal efficiency. Particularly, thermal energy from the high temperature cooling section 50a of the gasifier is employed in the heater 23, and optionally in heaters 65 and 165, to augment the heat applied to the multi-component working fluid by the gas turbine exhaust. Also, heat available from the low temperature cooling section 50b of the gasifier 48 is employed in the heater 27 to heat the condensed multi-component working fluid. Note that the feed temperature entering the HRVG, i.e., into the preheater or economizer section 14, is maintained above the acid gas dewpoint by the heater 27.

It will also be appreciated that fuel heating for the gas turbine or additional steam production can be accomplished by a heat exchanger 63 employing an extraction from the IP turbine exhaust from line 34. The temperature of the multi-component stream leaving heat exchanger 63 is controlled to approximately equal the temperature of the stream leaving regenerative preheater 21. The stream leaving the heater 63 rejoins line 42 prior to entering the LP vapor turbine. The heat source for the heater 63 can be an extraction of available heat from the gasifier, for example, from the low temperature section 50b.

Still further, if additional heat is available in the gasifier system, an additional heater 65 can be placed in parallel via line 67 with the HRGV, for example, with the preheater and evaporator sections 14 and 16, respectively, the supplied heat being from the gasifier as indicated by the line 69. Additional reheat could be accomplished as an option in heat exchanger 165 with heat exchange with the hot gasifier gas in the gas cooling section 50. The regenerative preheater 21 may be omitted based on plant economics and reheat of the IP exhaust for entry to the LP vapor turbine can be accomplished by utilizing the high level heat available in the gasifier. Further, low grade heat available in the gasifier and the optional air separation unit can be used to regenerate the working fluid in the DCSS. This low grade integration in the DCSS improves system performance by reducing turbine backpressure and effects cost reductions as a result of higher temperature driving force.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. In an integrated gasification combined cycle power generating system having a plurality of turbines, including first and second vapor turbines and a gas turbine for driving one or more generators for generating electricity or mechanical work, and a fuel gasifier for generating fuel gas for the gas turbine, a method of operating the system comprising the steps of:

(a) generating fuel gas from the fuel gasifier;
   (b) providing a heat recovery fluid from the fuel gasifier;
   (c) supplying the fuel gas from said fuel gasifier to a combustor for the gas turbine to drive the gas turbine;
   (d) expanding a two-component working fluid through the first vapor turbine;
   (e) reheating the expanded two-component working fluid from the first vapor turbine;
   (f) expanding the reheated two-component working fluid through the second vapor turbine;
   (g) condensing the working fluid exhausted from said second vapor turbine in a distillation/condensation subsystem;
   (h) passing the condensed working fluid in heat exchange relation with hot exhaust gases from the gas turbine for flowing heated working fluid to the vapor turbines; and
   (i) additionally heating the two-component working fluid supplied to the vapor turbines by passing the working fluid in heat exchange relation with the heat recovery fluid.

2. A method according to claim 1 wherein the condensed working fluid is heated in a heat recovery vapor generator in heat exchange relation with the exhaust gases from the gas turbine, and (j) cooling the working fluid exhausted from the second vapor turbine by passing the exhausted working fluid in heat exchange relation with a portion of the condensed working fluid passing through the heat recovery vapor generator.

3. A method according to claim 1 including (k) heating the condensed working fluid by passing the condensed working fluid in heat exchange relation with at least a portion of the working fluid exhausted from the second vapor turbine to form a partially condensed stream.

4. A method according to claim 1 wherein step (h) includes passing the condensed working fluid in heat exchange relation with the hot exhaust gas from the gas turbine in a superheater forming part of a heat recovery vapor generator, and step (i) is accomplished before the condensed working fluid passes through the superheater and after the working fluid passes through an evaporator forming part of the heat recovery vapor generator.

5. A method according to claim 1 including passing the condensed working fluid in heat exchange relation with a second heat recovery fluid and preheating the condensed working fluid by passing the condensed working fluid in heat exchange relation with the second heat recovery fluid.

6. A method according to claim 1 further including heating the condensed working fluid by passing the condensed working fluid in heat exchange relation with at least a portion of the working fluid exhausted from the second vapor turbine to form a partially condensed stream and passing the partially condensed stream to the distillation/condensation sub-system.

7. In an integrated gasification combined cycle power generating system having a plurality of turbines, including first and second vapor turbines and a gas turbine for driving one or more generators for generating electricity or mechanical work, and a fuel gasifier for generating fuel gas for the gas turbine, a method of operating the system comprising the steps of:

(a) generating fuel gas from the fuel gasifier;

(b) providing a heat recovery fluid from the fuel gasifier;

(c) supplying the fuel gas from said fuel gasifier to a combustor for the gas turbine to drive the gas turbine;

(d) expanding a two-component working fluid through the first vapor turbine;

(e) reheating the expanded two-component working fluid from the first vapor turbine;

(f) expanding the reheated two-component working fluid through the second vapor turbine;

(g) condensing the working fluid exhausted from said second vapor turbine;

(h) passing the condensed working fluid in heat exchange relation with hot exhaust gases from the gas turbine for flowing heated working fluid to the vapor turbines; and (i) heating spent working fluid exhausted from one of said first and second vapor turbines by passing the spent working fluid in heat exchange relation with the heat recovery fluid.

8. A method according to claim 7 wherein the first vapor turbine comprises a high pressure vapor turbine, and passing the working fluid expanded through the high pressure turbine in heat exchange relation with the heat recovery fluid.

9. In an integrated gasification combined cycle power generating system having (i) a plurality of turbines, including a first vapor turbine and a gas turbine drivingly coupled to one or more generators for producing electricity or mechanical work, (ii) a distillation/condensation sub-system and (iii) a fuel gasifier for generating fuel gas for the gas turbine, a method of operating the system comprising the steps of:

(a) generating fuel gas from the fuel gasifier;

(b) providing a heat recovery fluid from the fuel gasifier;

(c) supplying the fuel gas from said fuel gasifier to a combustor for the gas turbine to drive the gas turbine;

(d) expanding a working fluid comprised of a mixture of dissimilar components having different boiling points at the same pressure through said first vapor turbine and generating a spent stream of said mixture of dissimilar components;

(e) condensing said spent stream in said sub-system;

(f) supplying the condensed working fluid in heat exchange relation with hot exhaust gases from the gas turbine for flow of heated working fluid to the first vapor turbine; and (g) heating the working fluid by passing the working fluid in heat exchange relation with the heat recovery fluid.

10. A method according to claim 9 including a second vapor turbine and wherein the condensed working fluid is heated in a heat recovery vapor generator in heat exchange relation with the exhaust gases from the gas turbine, and cooling the working fluid exhausted from the second vapor turbine by passing the exhausted working fluid in heat exchange relation with a portion of the condensed working fluid passing through the heat recovery vapor generator.

11. A method according to claim 9 wherein step (f) is accomplished in part by passing the condensed working fluid in heat exchange relation with the hot gases from the gas turbine in a superheater and step (g) is accomplished before the condensed working fluid passes through the superheater.

12. A method according to claim 9 wherein the first vapor turbine comprises a high pressure vapor turbine, and passing the working fluid expanded through the high pressure turbine in heat exchange relation with the heat recovery fluid.

* * * * *